No. 790,643. PATENTED MAY 23, 1905.
J. F. LINEHAN.
PIPE ROUNDING DEVICE.
APPLICATION FILED JAN. 19, 1905.

2 SHEETS—SHEET 1.

Witnesses:

Inventor,
John F. Linehan,
by Samuel W. Balch
Attorney.

No. 790,643. PATENTED MAY 23, 1905.
J. F. LINEHAN.
PIPE ROUNDING DEVICE.
APPLICATION FILED JAN. 19, 1905.
2 SHEETS—SHEET 2.
Fig. 3.
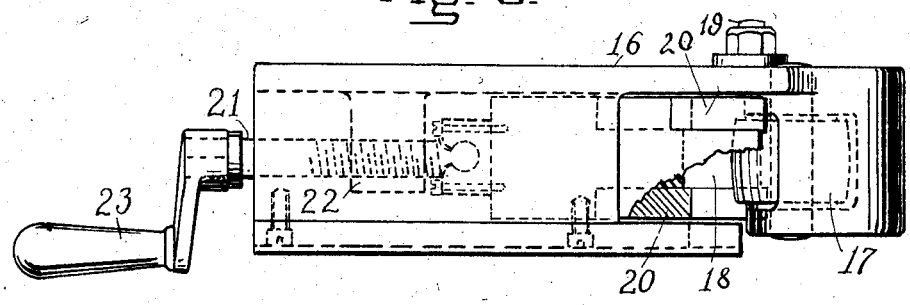
Fig. 4. Fig. 5.
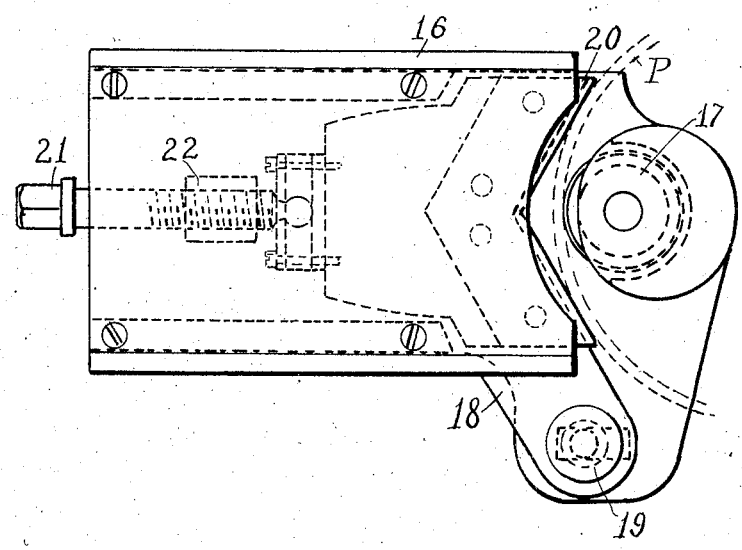 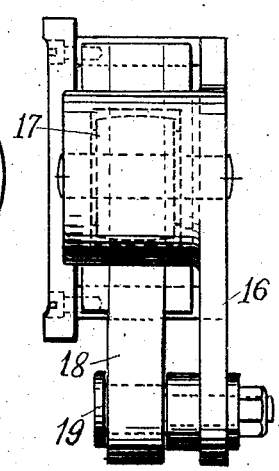
Witnesses:
Inventor,
John F. Linehan
by Samuel W. Balch
Attorney No. 790,643. Patented May 23, 1905.

UNITED STATES PATENT OFFICE.

JOHN F. LINEHAN, OF YONKERS, NEW YORK, ASSIGNOR TO D. SAUNDERS' SONS, OF YONKERS, NEW YORK, A CORPORATION OF NEW YORK.

PIPE-ROUNDING DEVICE.

SPECIFICATION forming part of Letters Patent No. 790,643, dated May 23, 1905.

Application filed January 19, 1905. Serial No. 241,744.

*To all whom it may concern:*

Be it known that I, JOHN F. LINEHAN, a citizen of the United States of America, and a resident of Yonkers, county of Westchester, and State of New York, have invented certain new and useful Improvements in Pipe-Rounding Devices, of which the following is a specification.

This invention relates to an arrangement of jaws for bringing the end of a pipe or tube into a more truly circular form and for expanding the pipe near its end and slightly tapering the end for the purpose of preparing the end for cutting a thread thereon. The jaws are employed in connection with a machine—as, for example, a pipe cutting and threading machine—wherein the pipe is passed through and rotated about its axis by a suitably-driven hollow spindle. Such a machine is ordinarily provided with devices for cutting off pipe and threading the ends thereof.

The objects of this invention are to produce a pipe-rounding device of simple, inexpensive, and compact form, readily adjustable and easily operated in conjunction with a pipe cutting and threading machine, and so mounted that it can be readily brought into operative position or removed therefrom, so as not to obstruct other operations, as cutting off or threading, which the pipe-machine may be organized to perform.

Figure 1:
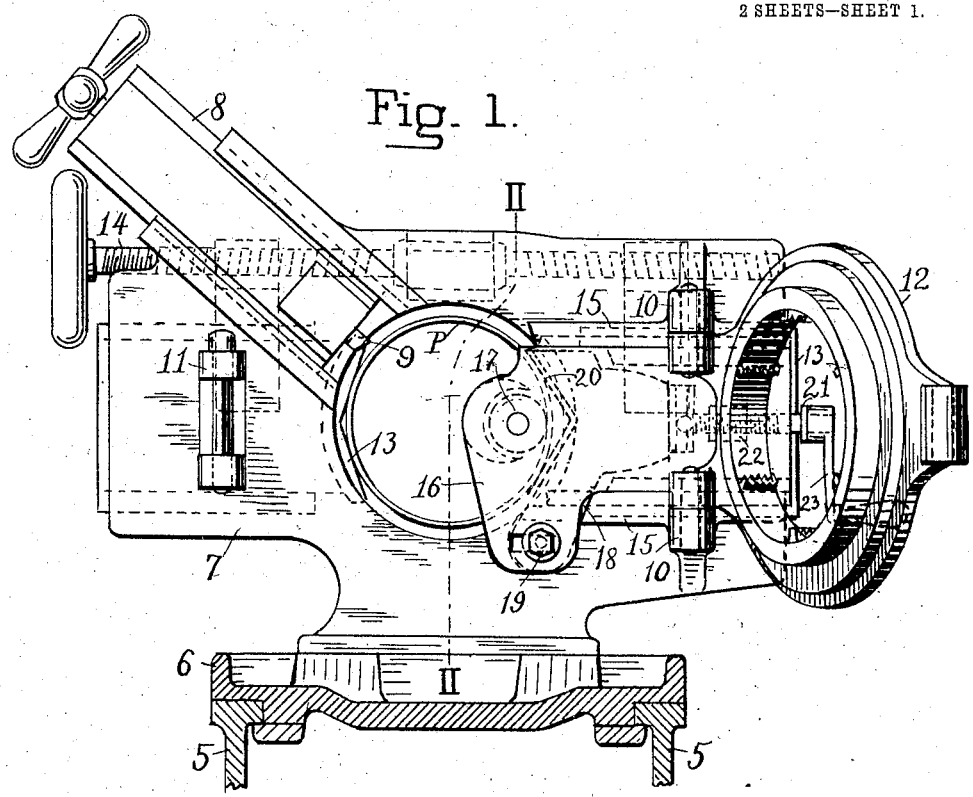
Figure 2:
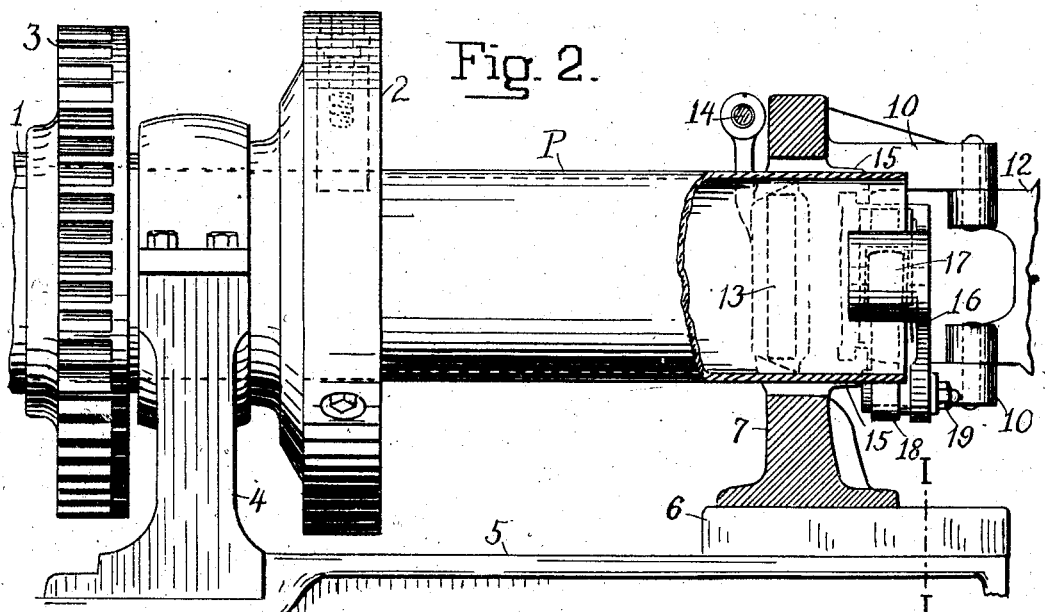

In the accompanying two sheets of drawings, which form a part of this application, Figure 1 is an end view of a pipe cutting and threading machine, showing the cutting-head with the pipe-rounding device supported thereon, the carriage and bed of the machine being shown in section on the line I I of Fig. 2 and the die-plate being swung out of operative position. Fig. 2 is a side elevation of the pipe cutting and threading machine with a pipe held therein and the pipe-rounding device in place for operating on the pipe, the cutting-head being in section on the line II II of Fig. 1 and the pipe broken away at the end. Fig. 3 is a top view of the pipe-rounding device, the swinging jaw-block and one jaw supported thereby being broken away. Fig. 4 is a view of the device from the side which faces the cutting-head of the machine. Fig. 5 is an end view of the device.

The pipe-machine comprises suitable means for rotating pipe, which in the form illustrated consists of a hollow spindle 1, through which a pipe P can be passed. On the end of the spindle is a chuck 2 for holding the pipe, and suitable power mechanism, as the gear 3 on the spindle, is provided for the rotation of the spindle. The frame of the machine as illustrated comprises a supporting-head 4 for the spindle, a bed-frame or ways 5 for a carriage 6, and a cutting-head 7. The cutting-head supports a slide 8, with a cutting-off tool 9, and three projecting arms 10, 10, and 11, to which a plate 12, which carries the threading-die, is respectively hinged and latched. The head also carries steadying-jaws 13 13 for steadying the pipe. These jaws are operated by a screw 14, one end of which is threaded left hand and the other end of which is threaded right hand.

The cutting-head or portion of the frame of the machine which supports the steadying-jaws, cutting-off tool, and die-plate is provided with ways 15 15, which may be either cast or bolted to the frame. A slide 16, which is formed with a roller-jaw 17 for engagement with the inside of the pipe, is mounted in the ways, and as it is not controlled by a screw or equivalent device it is free to slide transversely in the ways, so that the jaw will readily adjust itself to a bearing against the inside of the pipe. The roller of this jaw is preferably made somewhat crowning. A jaw-block 18 is pivotally supported on the slide by means of a stud-bolt 19. This stud-bolt passes through a slot in the slide and is clamped thereto in a position suited to the size of pipe to be operated upon. Two jaw-plates 20 20 are pinned to the jaw-block 18 and lie opposite the two ends of the roller of the roller-jaw, with the crowning part of the roller-jaw opposite a point midway between the jaw-plates. Each of these jaw-plates is formed with a notch, so as to give two bearing-points or points of engagement with the outside of the pipe, and they constitute an opposing jaw to the jaw in engagement with the inside of the pipe. This jaw is operated against the outside of the pipe by means of a screw 21, which is tapped through a nut 22, supported on the slide 16. Friction is reduced and the power requisite to rotate the pipe when using the rounding device is lessened by providing a roller at the bearing-point of the jaw which bears against the inside of the pipe. This, however, is not necessary for the device when used in connection with a pipe cutting and threading machine, as such a machine is always provided with ample power, and rollers may be either used or omitted at at any or all of the bearing-points.

To operate the device, the jaws are sufficiently separated by slackening the operating-screw to admit the edge of the pipe end in which irregularities are to be corrected and which is to be prepared for threading. The device is brought into the position shown in Fig. 1 and the carriage moved on the bed-frame of the pipe-machine to bring the jaws of the rounding device into engagement with the edge of the pipe. The stud-bolt is then adjusted and clamped in the slot to bring the jaw-plates carried by the pivoted jaw-block to an even bearing against the outside of the pipe. The machine is then driven and the jaws closed on the edge of the pipe by turning the handle 23 of the operating-screw until the edge of the pipe has been sufficiently trued and tapered. The crowning part of the roller-jaw is thereby brought against the inside of the pipe at a point slightly back from the end and expands the pipe slightly at this point. At the same time the jaw-plates bear against the outside of the pipe, one at the end of the pipe and the other back from the end at about twice the distance of the roller-jaw, thereby tending to reduce the diameter of the pipe opposite the plates. The principal action, however, is to true the pipe and slightly taper it from the point opposite the roller-jaw to the end which is opposite one of the jaw-plates. When this operation has been performed and it is desired to use the machine for other purposes, as cutting off or threading the pipe, the carriage is run back to disengage the rounding device from the end of the pipe, and then the device is slid to the right, as viewed in Fig. 1, where it would be out of the way of the die and the pipe and other operating parts.

What I claim as new, and desire to secure by Letters Patent of the United States, is—

1. The combination in a pipe-machine with means for rotating pipe, of a pipe-rounding device comprising a slide, a jaw mounted on the slide for engagement with the inside of the pipe, an opposing jaw pivotally supported on the slide for engagement with the outside of the pipe, and means for operating the second jaw about its pivot-support for effecting operative engagement with the pipe.

2. The combination in a pipe-machine with means for rotating pipe, of a pipe-rounding device comprising a slide supported by the frame of the pipe-machine and freely slidable transversely on said frame, a jaw mounted on the slide for engagement with the inside of the pipe, an opposing jaw pivotally supported on the slide for engagement with the outside of the pipe, and means for operating the second jaw about its pivot-support for effecting operative engagement with the pipe.

Signed by me at Yonkers, New York, this 16th day of January, 1905.

JOHN F. LINEHAN.

Witnesses:
JAMES S. FITCH,
WILLIAM B. FINK.